United States Patent
Harabayashi

(10) Patent No.: US 10,688,956 B2
(45) Date of Patent: Jun. 23, 2020

(54) HOLLOW WEAVE AIRBAG

(71) Applicant: SUMISHO AIRBAG SYSTEMS CO., LTD., Matsuura-shi, Nagasaki (JP)

(72) Inventor: Teppei Harabayashi, Matsuura (JP)

(73) Assignee: SUMISHO AIRBAG SYSTEMS CO., LTD., Matsura-Shi (JP)

( * ) Notice: Subject to any disclaimer, the term of this patent is extended or adjusted under 35 U.S.C. 154(b) by 154 days.

(21) Appl. No.: 15/766,575

(22) PCT Filed: Oct. 7, 2016

(86) PCT No.: PCT/JP2016/079930
§ 371 (c)(1),
(2) Date: Apr. 6, 2018

(87) PCT Pub. No.: WO2017/061595
PCT Pub. Date: Apr. 13, 2017

(65) Prior Publication Data
US 2018/0319359 A1 Nov. 8, 2018

(30) Foreign Application Priority Data
Oct. 7, 2015 (JP) .................................. 2015-199585

(51) Int. Cl.
*B60R 21/235* (2006.01)
*D03D 1/02* (2006.01)
(Continued)

(52) U.S. Cl.
CPC .............. *B60R 21/235* (2013.01); *D03D 1/02* (2013.01); *D03D 11/02* (2013.01); *D03D 13/004* (2013.01);
(Continued)

(58) Field of Classification Search
CPC ...... B60R 2021/23547; B60R 21/2342; B60R 21/235; B66B 5/005; B66B 5/0056; B66B 5/288; D10B 2331/04; D10B 2505/124
See application file for complete search history.

(56) References Cited

U.S. PATENT DOCUMENTS 5,073,418 A * 12/1991 Thornton ............... B60R 21/235
139/387 R
5,098,125 A 3/1992 Thornton et al.
(Continued)

FOREIGN PATENT DOCUMENTS

| JP | 2002-180351 A | 6/2002 |
| JP | 2003-267176 A | 9/2003 |

(Continued)

OTHER PUBLICATIONS https://patents.google.com/patent/JP2005179806A/en?oq=JP2005179806 (Year: 2005).*
(Continued)

*Primary Examiner* — Arti Singh-Pandey
(74) *Attorney, Agent, or Firm* — Birch, Stewart, Kolasch & Birch, LLP

(57) ABSTRACT

The purpose of the present invention is to provide a hollow weave airbag wherein gas leakage from cut surfaces of a hollow weave airbag formed by lamination can be suppressed and internal pressure retention can be improved. Provided is a hollow weave airbag that is formed in an expandable bag shape by weaving at least two pieces of fabric, wherein: the hollow weave airbag includes an outer peripheral joining part positioned on the outer periphery of an expanding part, and an outer edge part extending to the outside of the outer peripheral joining part; at least part of the outer peripheral joining part and/or the outer edge part is provided with a twill-like structure area formed from a single weave structure; the twill-like structure area is con-
(Continued)

(A) 2/2 BASKET WEAVE  (B) REVERSIBLE FIGURED DOUBLE WEAVE  (C) 3/3 BASKET WEAVE (D) PLAIN WEAVE  (E) RIB WEAVE  (F) HOLLOW WEAVE (DOUBLE PLAIN WEAVE)

figured such that when a continuous connection line is formed by tying peak crossover points or valley crossover points in any of the up, down, left, and right directions in a minimum unit mapping for weave structure mapping, the connection line can extend diagonally in the weave structure mapping when viewed as a whole; and the outer surface of the hollow weave airbag is formed by lamination.

4 Claims, 6 Drawing Sheets

(51) Int. Cl.
  *D03D 11/02* (2006.01)
  *D03D 13/00* (2006.01)
  *B60R 21/2342* (2011.01)
(52) U.S. Cl.
  CPC . *B60R 21/2342* (2013.01); *B60R 2021/23547* (2013.01); *D10B 2331/04* (2013.01); *D10B 2505/124* (2013.01)

(56) References Cited

U.S. PATENT DOCUMENTS

| | | | |
|---|---|---|---|
| 5,865,464 A | 2/1999 | Kanuma et al. | |
| 6,455,449 B1* | 9/2002 | Veiga | B60R 21/235 280/728.1 |
| 2001/0020780 A1* | 9/2001 | Kato | B60R 21/235 280/743.1 |
| 2001/0030416 A1* | 10/2001 | Tanabe | B60R 21/232 280/743.1 |
| 2002/0140218 A1* | 10/2002 | Beasley, Jr. | B60R 21/231 280/743.1 |
| 2003/0060104 A1* | 3/2003 | Veiga | B32B 27/04 442/76 |
| 2003/0230878 A1* | 12/2003 | Inoue | B60R 21/213 280/730.2 |
| 2004/0147186 A1* | 7/2004 | Konishi | B60R 21/26 442/76 |
| 2008/0001385 A1* | 1/2008 | Konishi | B60R 21/2346 280/730.2 |

FOREIGN PATENT DOCUMENTS

| | | |
|---|---|---|
| JP | 2003-312424 A | 11/2003 |
| JP | 2005-179806 A | 7/2005 |
| JP | 2012-52280 A | 3/2012 |
| JP | 2014-240261 A | 12/2014 |
| WO | WO 95/20507 A1 | 8/1995 |
| WO | WO 2015/146707 A1 | 10/2015 |

OTHER PUBLICATIONS https://patents.google.com/patent/JP2002180351A/en?oq=jp2002180351 (Year: 2000).*

Extended European Search Report, dated Apr. 16, 2019, for European Application No. 16853746.2.

International Search Report (PCT/ISA/210) issued in PCT/JP2016/079930, dated Dec. 20, 2016.

* cited by examiner (A) 6-HARNESS TWILL (B) 7-HARNESS TWILL (C) 8-HARNESS TWILL (D) 4-HARNESS TWILL (ARRANGED 2 YARNS IN PARALLEL)

(E) 7-HARNESS SATIN (F) 8-HARNESS SATIN (G) 8-HARNESS SATIN (H) POINTED TWILL (I) POINTED TWILL (J) POINTED TWILL (ARRANGED 2 YARNS IN PARALLEL)

(A) 2/2 BASKET WEAVE (B) REVERSIBLE FIGURED DOUBLE WEAVE (C) 3/3 BASKET WEAVE (D) PLAIN WEAVE (E) RIB WEAVE (F) HOLLOW WEAVE (DOUBLE PLAIN WEAVE)

HOLLOW WEAVE AIRBAG

TECHNICAL FIELD

The present invention relates to an airbag for an automobile, which is formed in an inflatable bag shape by a hollow weave, in particular, prevents gas leakage from a cut face of a laminated hollow weave airbag, and improves internal pressure maintaining performance.

BACKGROUND ART

With respect to an airbag installed as a safety device for an automobile, in an airbag prepared by a hollow weave, two pieces of base fabric are joined by a weave to form an inflatable inflation part, and in order to provide airtightness, a coating material such as a silicone resin is applied onto the outer surface.

However, in a case of trying to obtain favorable internal pressure maintaining performance by such a method, it is required to increase the applying amount of a silicone resin, the thickness and the weight are increased, and the storability may be deteriorated in some cases. In addition, it is known that in the outer peripheral joining part positioned on the outer periphery of an inflation part, weave shifting (yarn slippage) of the base fabric is easily generated at the time of inflation, and in a hollow weave airbag by silicone coating, the gas leakage generated from the yarn slippage point greatly affects the internal pressure maintaining performance of the airbag.

Accordingly, as one of the methods for improving the internal pressure maintaining performance, a hollow weave airbag by lamination has been studied. According to the lamination, reduction of the internal pressure maintaining performance due to yarn slippage of an outer peripheral joining part is improved. However, by suppressing the gas leakage from the yarn slippage in the outer peripheral joining part, gas leakage from a cut face is generated, and there has been a case where sufficient internal pressure maintaining performance is not obtained.

There have been no sufficient studies to cope with the gas leakage from a cut face of such a laminated hollow weave airbag.

For example, in Patent Literature 1, a technique in which in a hollow weave airbag that has a closed part including two or more weaves and adjacent to the bag part, and the closed part is constituted of a first weave from the bag part side, and a second weave adjacent to the opposite bag part side, by making the first weave looser than the second weave, the stress at the time of deployment does not concentrate, and an opening is suppressed has been disclosed. However, in this literature, gas leakage from a cut face has not been considered, and it cannot be said that it is sufficient as a technique for suppressing gas leakage particularly from a laminated hollow weave airbag.

Further, in Patent Literature 2, a technique in which in a weave of a boundary part between a non-inflating part and an inflating part as a bag body, by having a weave in which upper fabric constituent yarns repeat sinking and floating once or more under lower fabric constituent yarns, and the lower fabric constituent yarns repeat sinking and floating once or more on the upper fabric constituent yarns, the upper fabric constituent yarns and the lower fabric constituent yarns both constituting multiple fabric, the yarn slippage in the boundary part is reduced has been disclosed. Although it is considered that it is effective for suppressing the gas leakage due to yarn slippage by having high weave density in a joining part, as in Patent Literature 1, gas leakage from a cut face has not been considered.

As described above, in these literatures, effective countermeasures against the gas leakage from a cut face forming the outer periphery of an airbag that is an object of the present invention have not been suggested.

CITATION LIST

Patent Literature

PATENT LITERATURE 1: JP-A-2003-267176
PATENT LITERATURE 2: JP-A-2003-312424

SUMMARY OF INVENTION

Technical Problem

An object of the present invention is to provide an airbag in which by providing a twill-like structure area in which the part where a coating material easily permeates the inside of base fabric is continuously formed, in at least part of an outer region of an inflation part of a laminated hollow weave airbag, a shielding part for suppressing gas leak is arranged, gas leakage from a cut face is suppressed, and the internal pressure maintaining performance can be improved.

Solution to Problem

In order to solve the problem described above, the present invention is a hollow weave airbag formed in an inflatable bag shape by weaving at least two pieces of base fabric, wherein
the hollow weave airbag includes an outer peripheral joining part positioned on an outer periphery of an inflation part, and an outer edge part extending on the outside of the outer peripheral joining part;
a twill-like structure area made of a single weave is provided in at least part of the outer peripheral joining part and/or the outer edge part;
the twill-like structure area is constituted such that when a continuous connection line is formed by connecting the same peak weave points or the same valley weave points in any of up, down, left, and right directions in a minimum unit diagram of a weave diagram, the connection line extends in a diagonal direction of the weave diagram when viewed as a whole; and
an outer surface of the hollow weave airbag is laminated.

In addition, in another embodiment of the present invention, in the twill-like structure area, a collective connection line formed by connecting the connection line of the minimum unit diagrams adjacent to each other extends along the outer peripheral shape of the inflation part when viewed as a whole.

In addition, in another embodiment of the present invention, the twill-like structure area is positioned in the outer edge part extending on the outside of the outer peripheral joining part and is continuous over an entire periphery in a shape along the outer peripheral joining part.

In addition, in another embodiment of the present invention, the twill-like structure area has a width of 10 to 100 warps or wefts.

DESCRIPTION OF EMBODIMENTS

An embodiment for carrying out the present invention will be described in detail.

The present invention is a hollow weave airbag formed in an inflatable bag shape by weaving at least two pieces of base fabric, in which the hollow weave airbag includes an outer peripheral joining part positioned on an outer periphery of an inflation part, and an outer edge part extending on the outside of the outer peripheral joining part; a twill-like structure area made of a single weave is provided in at least part of the outer peripheral joining part and/or the outer edge part; when a continuous connection line is formed by connecting the same peak weave points or the same valley weave points in any of up, down, left, and right directions in a minimum unit diagram of the weave diagram, the twill-like structure area is constituted such that the connection line extends in a diagonal direction of the weave diagram when viewed as a whole; and an outer surface of the hollow weave airbag is laminated.

Figure 1:
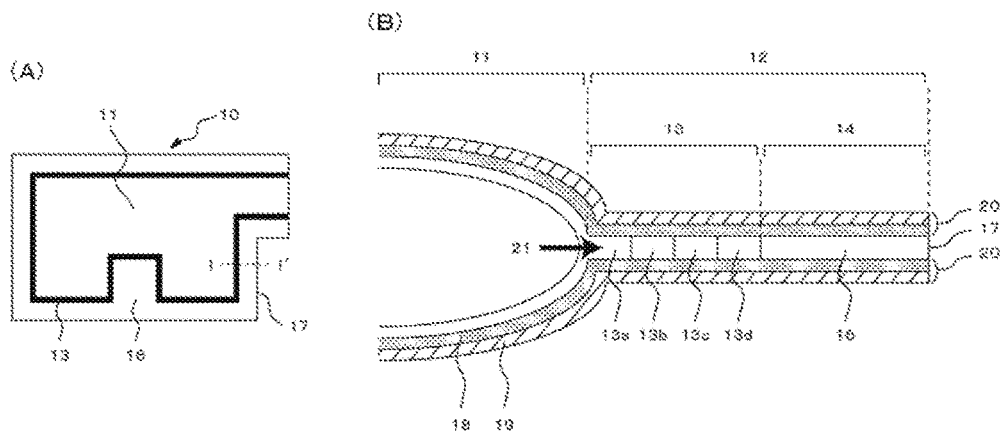
FIG. 1 is a diagram showing an example (in a case of an ordinary outer peripheral joining part and an ordinary outer edge part) according to a conventional technique.
Figure 2:
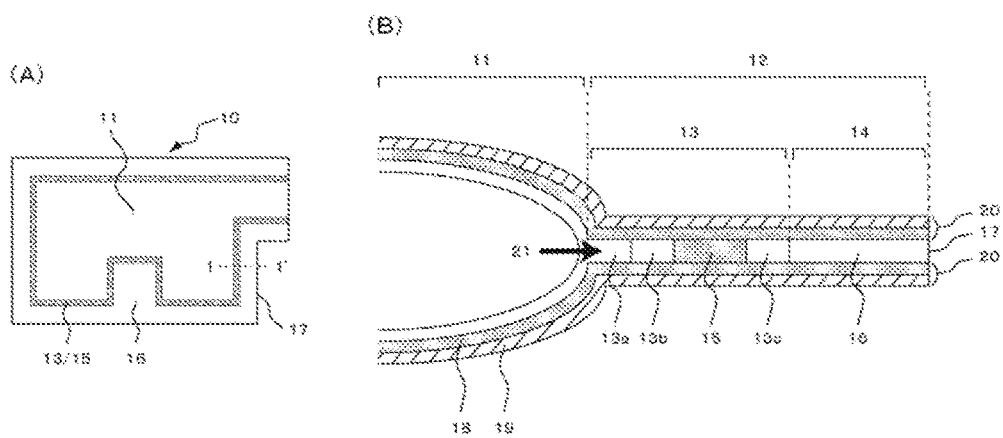
FIG. 2 is a diagram showing an example (in a case where a twill-like structure area is provided in an outer peripheral joining part) of an embodiment of the present invention.
Figure 3:
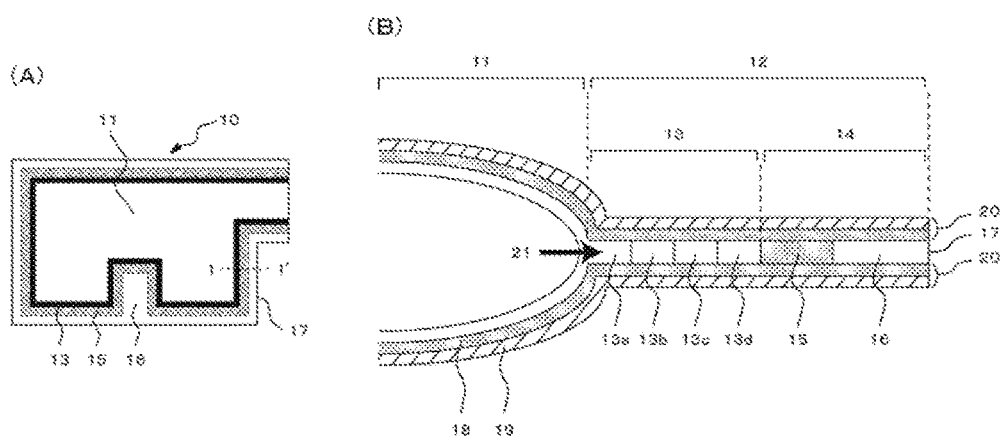
FIG. 3 is a diagram showing an example (in a case where a twill-like structure area is provided in an outer edge part connected to an outer peripheral joining part) of an embodiment of the present invention.
Figure 4:
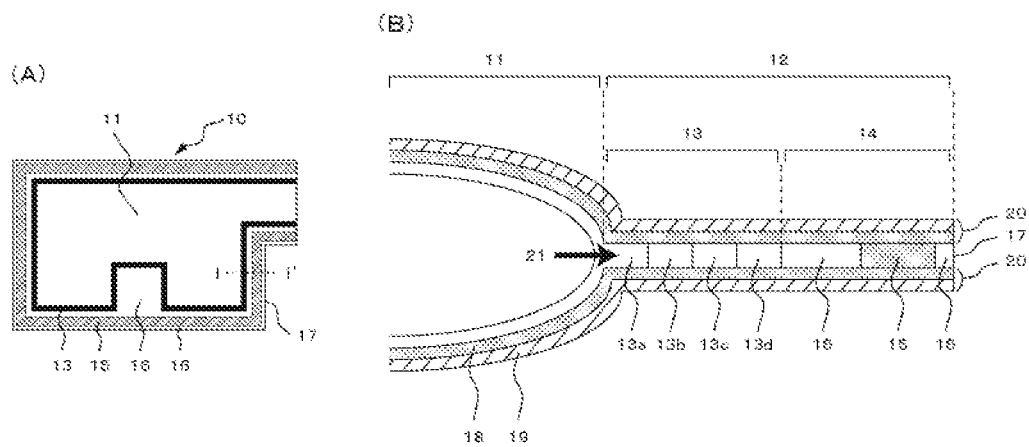
FIG. 4 is a diagram showing an example (in a case where a twill-like structure area is provided in an outer edge part spaced apart from an outer peripheral joining part) of an embodiment of the present invention.

FIG. 1 shows an example according to a conventional technique. FIGS. 2 to 4 each show an example of the embodiment of the present invention. (A) of each of FIGS. 1 to 4 shows an example of the overall view, and (B) of each of FIGS. 1 to 4 shows a 1-1' sectional view of the overall view. As shown in FIGS. 1 to 4, an airbag 10 includes an inflation part 11 formed in an inflatable bag shape by a hollow weave, and an outer region 12 positioned on the outside of the inflation part. The outer region 12 includes an outer peripheral joining part 13 formed by joining 2 pieces of fabric with a weave, and an outer edge part 14 extending on the outside of the outer peripheral joining part. The surface of the base fabric is covered with a coating material 20 including a coating layer 19, and an adhesive layer 18 that bonds the coating layer 19 to the base fabric. As described above, in the laminated hollow weave airbag, gas leak is hardly generated from the boundary part between the inflation part and the outer peripheral joining part. Therefore, the gas filled in the inflation part passes through the gaps of fibers of the base fabric or a weave, and planarly diffuses, and finally tries to flow out to a cut face 17 that is not covered with the coating layer. The reference number 21 shows the flow of gas from the inflation part to the cut face.

The hollow weave airbag of the present invention has a twill-like structure area 15 at least part of the outer region 12. In an example shown in FIG. 2, the outer peripheral joining part 13 includes multiple weave parts 13a to 13c, and a twill-like structure area 15 is provided between the weave parts 13b and 13c in the outer peripheral joining part. In an example shown in FIG. 3, the outer peripheral joining part 13 includes multiple weave parts 13a to 13d, and a twill-like structure area 15 is provided on the outside of the outer peripheral joining part. In an example shown in FIG. 4, a weave part 16 is provided between the outer peripheral joining part 13 and the twill-like structure area 15, and the twill-like structure area 15 is spaced apart from the outer peripheral joining part 13. In the example in FIG. 1 of a conventional technique, a twill-like structure area 15 is not provided.

Figure 5:
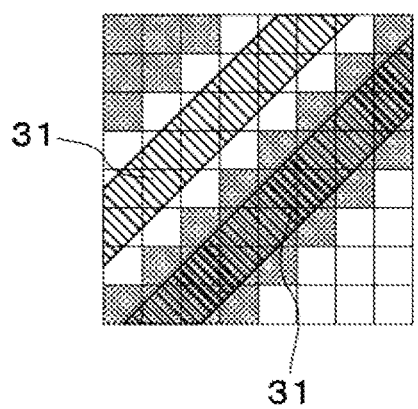
FIG. 5 is a diagram showing an example of the continuity of the parts where an adhesive layer can permeate even the inside of base fabric in the twill-like structure area of the present invention.

In this twill-like structure area 15, as shown in an example in FIG. 5, a permeation part 31 that allows an adhesive layer to permeate even the inside of base fabric due to the pressure applied during lamination is continuously formed, and the shielding part is continuously formed as if being a weir by the permeated adhesive layer. Accordingly, the air leakage from the inflation part 11 to the cut face 17 can be suppressed, therefore, the internal pressure maintainability of the airbag 10 can be improved.

Figure 6:
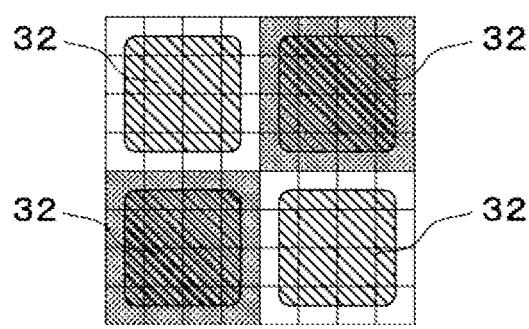
FIG. 6 is a diagram showing an example of the discontinuity of the parts where an adhesive layer can permeate even the inside of base fabric in a weave not according to the present invention.

In addition, as in the example shown in FIG. 6, in a weave such as a basket weave that is usually used in an outer peripheral joining part of a hollow weave airbag, a permeation part 32 that allows an adhesive layer material to permeate even the inside of base fabric due to the pressure applied during lamination is discontinuously formed as if being an island, and an effect of suppressing the gas leakage from a cut face is hardly obtained.

In the present invention, it is important to provide a twill-like structure area in which the part where a coating material for imparting airtightness easily permeates the inside of base fabric is continuously formed in at least part of the outer region positioned on the outside of an inflation part (that is, an outer peripheral joining part, and/or an outer edge part extending on the outside of the outer peripheral joining part). By providing the twill-like structure area, the part where a coating material permeates the inside of base fabric is continuously formed, and the gas leak from the inflation part, in particular, the gas passing through the inside of the cross section of the base fabric and leaking from a cut face of an airbag can be blocked.

The twill-like structure area can be provided in at least part of an outer peripheral joining part adjacent to an inflation part or in at least part of an outer edge part extending from the outside of the outer peripheral joining part up to a cut face, or in at least part of both of these parts.

In a case where the outer peripheral joining part is constituted of multiple weaves, the twill-like structure area may be provided in any of the innermost layer position of the outer peripheral joining part adjacent to the inflation part, the intermediate layer position of the outer peripheral joining part, and the outermost layer position of the outer peripheral joining part. The position is not particularly limited as long as the characteristics to be demanded, particularly the airtightness can be improved, and a position distant from the inflation part, for example, the outermost layer position is preferred.

In a case where the twill-like structure area is provided in at least part of the outer peripheral joining part, the gas leakage from a cross section of the base fabric can be more efficiently blocked by providing the twill-like structure area in the outer side of the outer peripheral joining part, in which the flow of gas is easily prevented due to the resistance of the cross section weave of the base fabric, as compared with providing the twill-like structure area in the inner side of the outer peripheral joining part that is adjacent to an inflation part where the flow rate of gas leakage is large.

In addition, also in a case where the twill-like structure area is provided in the outer edge part extending on the outside of the outer peripheral joining part, the twill-like structure area may be provided depending on the characteristics to be demanded. For example, the twill-like structure area may be provided so as to be connected continuously to the outer peripheral joining part, or the twill-like structure area may be provided so as to be spaced apart from the outer peripheral joining part by arranging a weave part between the outer peripheral joining part and the twill-like structure area.

In the present invention, it is essential that when a continuous connection line is formed by connecting the same peak weave points or the same valley weave points in any of up, down, left, and right directions in a minimum unit diagram of the weave diagram, the twill-like structure area is constituted such that the connection line extends in a diagonal direction in the weave diagram when viewed as a whole.

In the present invention, as the weave constituting the twill-like structure area, a twill weave, or a satin weave is preferred. Further, it is preferred that by using these weaves singly or in combination, the peaks or valleys of weave points are allowed to continue with a width of 10 to 100 warps or wefts because the continuity is easily maintained in the part where a coating material permeates the inside of base fabric. By using these weaves, the part where a coating material permeates the inside of the weave in the twill-like structure area continues, and the flow of the gas leaking through a cross section of base fabric is prevented, and the gas leakage from the airbag can be minimized.

It is essential that the twill-like structure area of the present invention is a single weave. With a double weave such as a hollow weave, or a reversible figured double weave, the gap between two pieces of base fabric becomes wider. Therefore, a large amount of coating material is required in order to prevent the flow of the gas leaking through the inside of base fabric, and it becomes difficult to ensure the airtightness. In addition, the hardness, weight, and the like of the part are also increased, and such a situation is not preferred.

Figure 13:
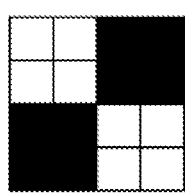
FIG. 13 is a diagram showing an example of the weave used for an outer peripheral joining part of a conventional technique.
Figure 13:
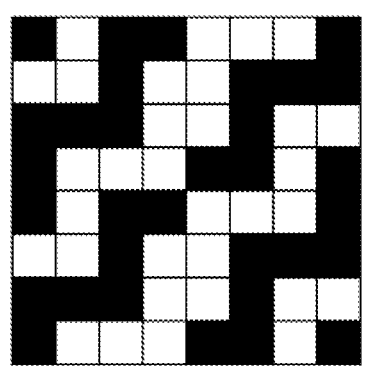
Figure 13:
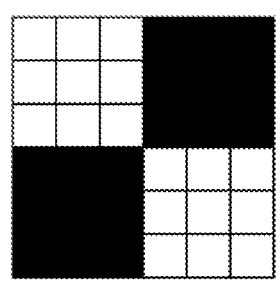
Figure 13:
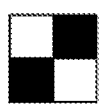
Figure 13:
Figure 13:
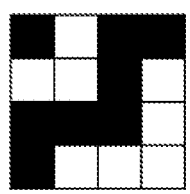

In the practice of the present invention, the weave excluding the twill-like structure area, which is used for an outer peripheral joining part, may be appropriately selected depending on the performance to be required, for example, whether or not the weave can withstand the pressure of an inflation part. For example, in general, a plain weave used for an outer peripheral joining part of a hollow weave airbag, a basket weave (2/2, or 3/3), a single weave such as a rib weave, and a double weave such as a reversible figured double weave, and a hollow weave may be used singly or in combination. An example of such a weave is shown in FIG. 13. FIG. 13(A) shows a 2/2 basket weave. FIG. 13(B) shows a reversible figured double weave. FIG. 13(C) shows a 3/3 basket weave. FIG. 13(D) shows a plain weave. FIG. 13(E) shows a rib weave. FIG. 13(F) shows a hollow weave (double plain weave).

These weaves are different from the weave diagram defined with respect to the twill-like structure area of the present invention, and therefore, the weaves are not a subject of a weave used in the twill-like structure area of the present invention.

In addition, in the practice of the present invention, the weave excluding the twill-like structure area, which is used for an outer edge part, may be appropriately selected depending on the performance to be required, for example, the weaving performance, or whether or not the weave has sufficient strength. For example, a partial dual-layered weave in which a double weave is partially bound, another single weave of the present invention, or the like may be appropriately selected, and all of the outer edge part may be formed of the twill-like structure area of the present invention.

Figure 9:
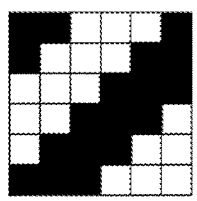
FIG. 9 is a diagram showing an example of a minimum unit diagram of a weave suitable for the twill-like structure area of the present invention, and an example of a weave diagram combining the minimum unit diagrams.
Figure 9:
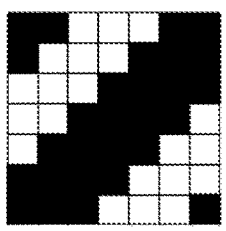
Figure 9:
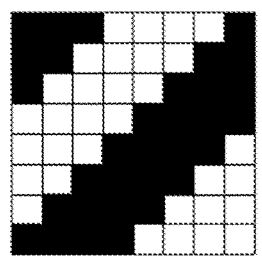
Figure 9:
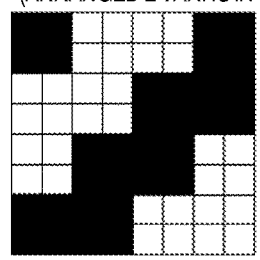
Figure 9:
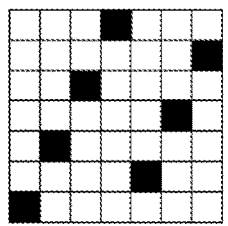
Figure 9:
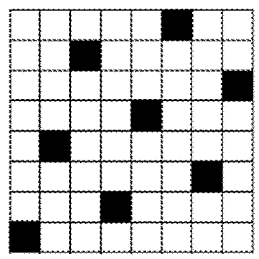
Figure 9:
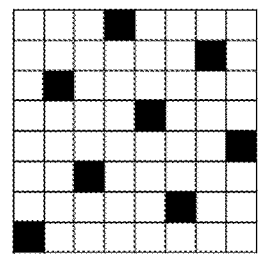
Figure 9:
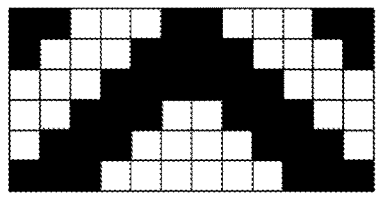
Figure 9:
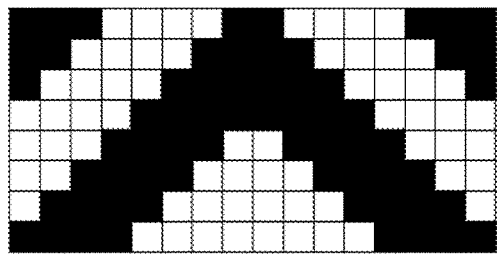
Figure 9:
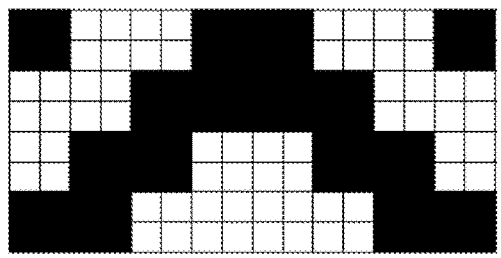

An example of a minimum unit diagram of each of the weaves suitable for the twill-like structure area of the present invention is shown in FIGS. 9(A) to 9(G). FIG. 9(A) shows a 6-harness twill. FIG. 9(B) shows a 7-harness twill. FIG. 9(C) shows an 8-harness twill. FIG. 9(D) shows a 4-harness twill (arranged 2 yarns in parallel). FIG. 9(E) shows a 7-harness satin. FIGS. 9(F) and 9(G) each show an 8-harness satin.

The weave used for the twill-like structure area may also be a weave in which an arrangement such as performing the rotation or the inversion, exchanging the peaks and the valleys, or changing the start point of the weave is performed in the minimum unit diagram shown in each of FIGS. 9(A) to 9(G). Further, in some cases, the weave includes the arrangement described above in combination. For example, FIGS. 9(H) to 9(J) correspond to the arrangement. FIGS. 9(H) and 9(I) show a pointed twill. FIG. 9(J) shows a pointed twill (arranged 2 yarns in parallel)).

A woven fabric is a weave body formed of weave points where warps and wefts cross each other. This combination of the weave points is called a weave, and a grid diagram expressing a weave is called a weave diagram.

The constitution of the weave diagram used for describing the present invention is shown below. One longitudinal line of a grid is set to one warp, one horizontal line of a grid is set to one weft, and one square of a grid is set to a weave point. The weave point where the warp of the weave is on the upper side is referred to as a peak point (shown with a filled square on the grid), and the weave point where the weft of the weave is on the upper side is referred to as a valley point (shown with a non-filled square on the grid).

In the present invention, one example of the situation of being "constituted such that when a continuous connection line is formed by connecting the same peak weave points or the same valley weave points in any of up, down, left, and right directions in a minimum unit diagram of the weave diagram, the connection line extends in a diagonal direction of the weave diagram when viewed as a whole" will be described with reference to drawings.

Figure 10:
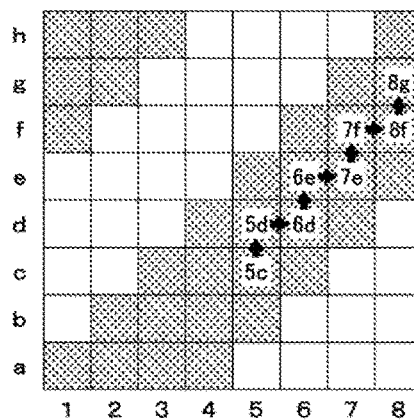
FIG. 10 is a diagram showing an example of the peaks or valleys of weave points, which are continuous in a diagonal direction of the weave diagram.

In an example of FIG. 10, 5*d* adjacent to a peak point 5*c* is the same peak point as the peak point 5*c*. When a continuous connection line is formed by connecting the same peak weave points or the same valley weave points as in 5*c*-5*d*-6*d*-6*e*-7*e*-7*f* . . . , the connection line extends in a diagonal direction in the weave diagram when viewed as a whole.

Figure 11:
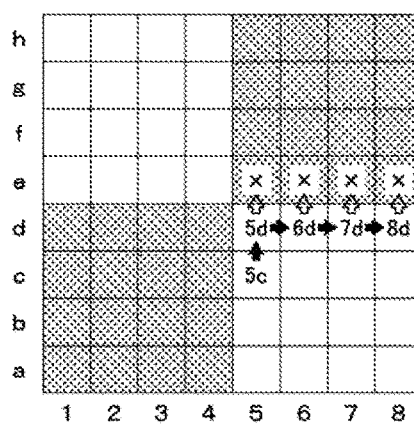
FIG. 11 is a diagram showing an example of the peaks or valleys of weave points, which are not continuous in a diagonal direction of the weave diagram.

On the other hand, in an example of FIG. 11, 5*d* adjacent to a valley point 5*c* is the same valley point as the valley point 5*c*, but a connection line is interrupted up to 5*c*-5*d*-6*d*-7*d*-8*d* and does not extend in a diagonal direction.

Figure 12:
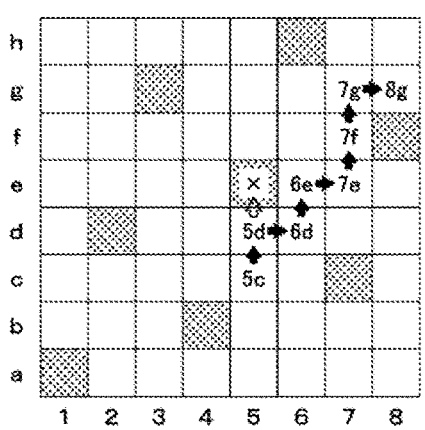
FIG. 12 is a diagram showing an example of the peaks or valleys of weave points, which are continuous in a diagonal direction of the weave diagram.

In addition, in an example of FIG. 12, the continuity of a valley point 5*c* in a vertical direction (upper direction) is interrupted at 5*d*. However, by connecting the same peak weave points or the same valley weave points as in 5*c*-5*d*-6*d*-6*e*-7*e*-7*f*-7*g* . . . , the connection line extends in a diagonal direction in the weave diagram when viewed as a whole, when the continuous connection line is formed.

In the present invention, it is essential that the twill-like structure area is formed of a single weave in which the peaks or valleys of weave points are continuous in a diagonal direction.

As the weave used for the twill-like structure area of the present invention, for example, there are a twill weave (4-harness twill, 5-harness twill, 6-harness twill, 7-harness twill, 8-harness twill, or 4-harness twill arranged 2 yarns in parallel), a satin weave (5-harness satin, 7-harness satin, 8-harness satin, or 9-harness satin), and the like, and these may be used singly or in combination.

It is preferred to appropriately select these weaves in consideration of the weaving performance in using the weaves.

In order to improve the weaving performance, the weave may be woven, for example, by arranging 2 warps and 2 wefts of a 2/2 4-harness twill in parallel. Further, if the continuity of the peaks and valleys is not interrupted, the peaks and valleys of weave points in some parts may be inverted.

The twill-like structure area according to the present invention can enhance the effect of suppressing the gas leakage to the maximum extent by effectively utilizing the coating material for imparting airtightness. In a case where a coating material is applied to a hollow weave airbag by a coating method, due to the difference in the weave structure between the inflation part and the outer peripheral joining part, irregularities on a surface of base fabric in a boundary part are increased, and the thickness of the coating material in this part tends to be uneven. In addition, when an airbag is inflated by gas, a small gap is generated due to the weave shifting (yarn slippage) of a woven fabric in the boundary part between an inflation part and an outer peripheral joining part adjacent to the inflation part. Accordingly, the coating material at the relevant point is easily stretched and damaged due to the internal pressure of the airbag, and the gas leakage from the point is increased. However, in a case where a coating material is applied by a lamination method, the thickness of the coating material applied to the surface of the base fabric is kept substantially the same thickness as that of the material before processing as compared with that in a case of a coating method, and damage of a coating material is hardly generated in the boundary part between the inflation part and the outer peripheral joining part, and therefore, there is almost no leakage from the point. However, when the leakage path from the yarn slippage part is blocked, the gas leaks through the inside of the cross section of the base fabric due to the gas pressure from the inflation part in a plane direction in which the base fabric expands, and eventually leaks out from a cut face that is the endmost part of the airbag base fabric.

In the present invention, the part where the coating material can sufficiently permeate even the inside of base fabric in the twill-like structure area is continuous, and therefore, the flow of the gas trying to pass through the cross section of the base fabric weave is suppressed, and the gas leakage can be prevented.

In addition, in another embodiment of the present invention, the part where a coating material can sufficiently permeate even the inside of base fabric in the twill-like structure area is continuous in a direction of interrupting the flow of the gas toward a cut face from the outer peripheral shape of an inflation part, and therefore, the flow of the gas trying to pass through the cross section of the base fabric weave can be more effectively suppressed.

Figure 7:
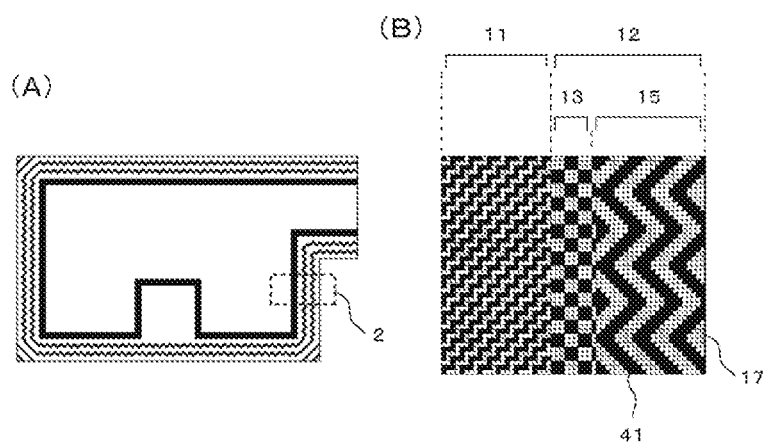
FIG. 7 is a diagram showing an example of the collective connection line extending along the outer peripheral shape of an inflation part in the twill-like structure area of the present invention.
Figure 8:
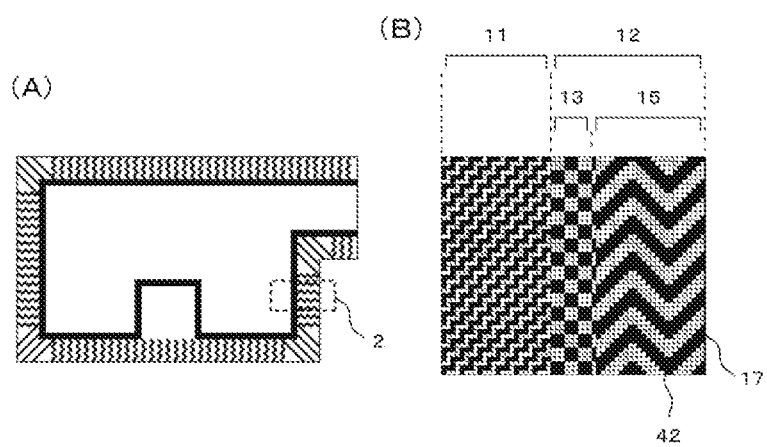
FIG. 8 is a diagram showing an example of the collective connection line not extending along the outer peripheral shape of an inflation part in the twill-like structure area of the present invention.

An example of the situation that "a collective connection line formed by connecting the connection line of the minimum unit diagrams adjacent to each other extends along the outer peripheral shape of the inflation part when viewed as a whole" in another embodiment of the present invention, is shown in FIG. 7. In addition, for ease of understanding, an example of the twill-like structure area of the present invention, which is in contrast with the example of FIG. 7, is shown in FIG. 8. (A) of each of FIGS. 7 to 8 shows an overall view, and (B) of each of FIGS. 7 to 8 is a weave diagram in the region shown by "2" in the overall view.

In an example in FIG. 7, in the twill-like structure area, a weave structure line 41 formed by connecting the shielding parts extends along the outer peripheral shape of an inflation part when viewed as a whole. Accordingly, the gas leakage from an inflation part 11 to a cut face 17 is effectively suppressed, and the internal pressure maintainability can further be improved, and therefore, this is preferred.

In an example in FIG. 8, in the twill-like structure area, in contrast with the example in FIG. 7, a weave structure line 42 formed by connecting the shielding parts extends in a direction perpendicular to the outer peripheral shape of an inflation part when viewed as a whole.

In any case of the examples in FIGS. 7 and 8, the effect of suppressing the gas leakage according to the present invention is effective, and therefore, the twill-like structure area may be appropriately selected depending on the performance to be required.

According to the present invention, a countermeasure against the gas leakage by a lamination method that is a coating process different from that of the coating method is obtained, and the internal pressure retaining performance of a product by a lamination method can further be enhanced.

The shape of the twill-like structure area used in the present invention may be selected depending on the characteristics to be demanded and may be arranged so as to be continuous over the entire periphery in a shape substantially along the outer peripheral joining part. By arranging the continuous shape along the outer peripheral joining part and over the entire periphery, the gas leak generated through the inside of base fabric weave can be suppressed on the entire outer periphery of an airbag, and extremely high internal pressure retention can be obtained.

In addition, the width of the twill-like structure area may also be selected depending on the weave of the twill-like structure area, the weave density, the yarn fineness to be used, the characteristics to be demanded, or the like, and may be appropriately selected from the range of 10 to 100 warps or wefts, and preferably 30 to 80 warps or wefts. Note that the above number of yarns is the number in a case where the fineness of the yarns to be used is converted to nylon 470 dtex, and in a case where the fineness of the yarns to be used is larger or smaller than the 470 dtex, the number of yarns may be the number obtained by multiplying by the coefficient=(470÷fineness of the yarns used). In a case where the specific gravity of the fiber material is different from that of nylon, the fineness may be a fineness converted from the specific gravity.

The width of the specific twill-like structure area may be around 3 to 30 mm.

In addition, the area ratio of the twill-like structure area provided in an outer peripheral joining part and/or an outer edge part extending on the outside of the outer peripheral joining part may be appropriately set in each of the positions. For example, the area ratio may be set in the range of 5 to 100%, and preferably 10 to 80% relative to the total area of each of the positions.

As the material for the warps and wefts used for the hollow weave airbag of the present invention, it is not particularly limited, and natural fibers, chemical fibers, inorganic fibers, or the like may be used. Among them, synthetic fibers are preferred because of having versatility and from the viewpoint of the production process of base fabric, the base fabric properties, or the like. The material may be appropriately selected from, for example, nylon 6, nylon 66, nylon 46, nylon 610, nylon 612, or the like alone; aliphatic polyamide fibers obtained by copolymerizing, or mixing nylon 6, nylon 66, nylon 46, nylon 610, nylon 612, and the like; copolymerized polyamide fibers of aliphatic amine and aromatic carboxylic acid, represented by nylon 6T, nylon 6I, and nylon 9T; polyethylene terephthalate, polytrimethylene terephthalate, polybutylene terephthalate, polyethylene naphthalate, or the like alone; polyester fibers obtained by copolymerizing, or mixing polyethylene terephthalate, polytrimethylene terephthalate, polybutylene terephthalate, polyethylene naphthalate, and the like; ultra-high molecular weight polyolefin-base fibers; chlorine-containing fibers such as vinylidene, and polyvinyl chloride; fluorine-containing fibers including polytetrafluoroethylene; polyacetal-based fibers; polysulfone-based fibers; polyphenylene sulfide-based fibers (PPS); polyetheretherketone-based fibers (PEEK); wholly aromatic polyamide-based fibers; wholly aromatic polyester-based fibers; polyimide-based fibers; polyetherimide-based fibers; polyparaphenylenebenzobisoxazole-based fibers (PBO); vinylon-based fibers; acrylic fibers; and the like. Among them, nylon 66 fibers are preferred from the viewpoint of the physical characteristics, the durability, the heat resistance, or the like. Further, polyester-based fibers, or nylon 6 fibers are also preferred from the viewpoint of the recycling.

In a fiber yarn used in the present invention, various kinds of additive agents that are usually used for improving the spinnability, the processability, the durability, or the like, for example, a heat-resistant stabilizer, an antioxidant, a light stabilizer, an age resister, a lubricant, a smoothing agent, a pigment, a water repellent agent, an oil repellent agent, a masking agent such as titanium oxide, a gloss imparting agent, a flame retardant, a plasticizer, and the like may be used singly or two or more kinds thereof in combination. In addition, processing such as twisting, bulky processing, crimp processing, wind processing, or size processing may be performed. Further, as for the form of the yarn, in addition to continuous filaments, staple fiber spun yarns, composite yarns thereof, or the like may be used.

The fineness of the fiber yarn used in the present invention may be the same as the fineness of the yarn usually used for airbag base fabric, that is, may be selected from the range of 150 to 1000 dtex, and preferably from the range of 235 to 700 dtex. If the fineness is smaller than 150 dtex, the strength required for an airbag tends to be difficult to obtain, and if the fineness exceeds 1000 dtex, the basis weight tends to be excessively large. Moreover, the single yarn fineness of these yarns may be appropriately selected in the range of 0.5 to 8 dtex, and preferably 0.5 to 4 dtex.

The strength of the fiber yarn used in the present invention is preferably in the range of 5 to 15 cN/dtex, and more preferably in the range of 6 to 10 cN/dtex. Within this range, the occupant protection performance can be sufficiently exerted without breaking the fiber yarn constituting the airbag base fabric even when an impact is given at high speed deployment.

As the loom for weaving the base fabric for the hollow weave airbag of the present invention, there is no particular limitation, and for example, a water jet loom, an air jet loom, a rapier loom, a projectile loom, or the like can be used. Among them, in consideration of the productivity, the damage to warps, the reduction of yarn contamination, or the like, a water jet loom, or an air jet loom is preferred. Further, a jacquard device, and a dobby device are used for forming the inflation part. In particular, in order to obtain a complicated weave, a jacquard device (electronic or mechanical) is preferred, and from the viewpoint of the productivity or the ease of weave change, an electronic jacquard device is more preferred.

The double weave of the base fabric of an inflation part of the hollow weave airbag of the present invention may be appropriately selected from among those used for the base fabric for an ordinary airbag, and may be, for example, any of a plain weave, a basket weave, a rib weave, a twill weave, a mixed weave thereof, and the like.

In addition, the weave density of the base fabric may also be selected in the range where the physical characteristics to be demanded for the base fabric of an airbag can be obtained, and for example, the warp density and the weft density may be each set to 25 to 80 yarns/2.54 cm. Further, as to the weave density, the warp density and the weft density may be set to be either the same as or different from each other.

The hollow weave airbag of the present invention may be in the range of 1250 to 2500 as a cover factor calculated from the yarn fineness and weave density to be used and may be selected depending on the characteristics to be demanded as an airbag.

Note that the cover factor can be calculated by the following equation.

$$CF = Nw \times \sqrt{Dw} + Nf \times \sqrt{Df}$$

where Nw and Nf are the weave densities (yarns/2.54 cm) of the warps and the wefts, respectively, and Dw and Df are the total finenesses (detx) of the warps and the wefts, respectively.

In the base fabric having the structure of the present invention, it is preferred to remove the sizing agent used at the time of weaving by scouring, and a known method such as a batch-type method, or a continuous-type method can be used. In addition, in order to impart the dimensional stability during processing or as a product, heat setting may be performed at 150 to 200° C.

Further, in the present invention, it is essential that the outer surface of an airbag is laminated with a coating material. In the laminated airbag, the air leakage due to the yarn slippage occurring at the boundary between an outer peripheral joining part and an inflation part is reduced, and the air leakage from a cut face is generated, and therefore, the suppressive effect by the twill-like structure area of the present invention is easily obtained.

In a case of a lamination method, the processing method is not particularly limited, a known method such as a) a dry lamination method (in which an adhesive agent is applied, drying is performed to evaporate a solvent, and then thermocompression bonding is performed), b) a wet lamination method (in which a water-soluble adhesive agent is applied for bonding, and then drying is performed), c) an extrusion lamination method (in which a molten resin is extruded onto base fabric), and d) a thermal lamination method (in which a coating material that has been formed into a film in advance is laminated, and then thermocompression bonding is performed) can be utilized. From the viewpoint of the processing cost or the environmental aspects, a thermal lamination method is preferred. As the thermoplastic material used for the coating material in a thermal lamination method, a thermoplastic material that is constituted in combination of a coating layer for preventing gas permeation, and an adhesive layer for enhancing the adhesion between the base fabric and the coating layer is preferred. In a case of a thermal lamination method, the processing temperature is accepted as long as it is higher than the melting point of an adhesive layer among the coating materials, and by setting the temperature to be a temperature 10° C. or more and preferably 20° C. or more higher than the melting point, for example, by setting to be 100 to 200° C., the adhesive layer is reliably melted, and the adhesion with the base fabric can be improved. As to the heating time, the heating time may be appropriately selected depending on the set processing temperature, and it is preferred that the heating is performed for at least 30 seconds or more, and preferably for 40 seconds to 180 seconds. As to the pressure at the time of bonding, a pressure at which base fabric and a molten adhesive layer can be brought into close contact with each other may be appropriately selected, and it is preferred to set the pressure at 4 N/cm2 or more for the surface pressure, and at 30 N/cm or more for the line pressure. In addition, it is also preferred to perform the lamination by combining a processing method such as a thermal lamination method, and a dry lamination method, for the purpose of further improving the adhesive strength.

With respect to the coating material to be subjected to the lamination, a thermoplastic material is preferred, and as the coating layer for constituting the coating material, a known material such as a homopolymer or copolymer of a polyester-based resin, a polyamide-based resin, a polyolefin-based resin, a polyurethane-based resin, a polyvinyl chloride-based resin, a polypropylene (PP)-based resin, a polyvinyl alcohol (PVA)-based resin, a polycarbonate (PC)-based resin, a polystyrene-based resin, a polyacrylonitrile-based resin, an ethylene-vinyl acetate (EVA)-based resin, an ethylene-vinyl alcohol (EVOH)-based resin, a silicone-based resin, a styrene-butadiene rubber (SBR)-based resin, a chloroprene rubber-based resin, or an ionomer resin; a copolymer of these resins with other kind of materials; and a modification thereof may be used.

Further, as the thermoplastic resin used for the adhesive layer, for example, a homopolymer or copolymer of a polyamide-based resin, a polyolefin-based resin, a polyurethane-based resin, a polyacrylic resin, an ethylene-vinyl acetate (EVA)-based resin, an epoxy-based resin, a vinyl chloride-based resin, a chloroprene rubber-based resin, a cyanoacrylate-based resin, a silicone-based resin, a styrene-butadiene rubber (SBR)-based resin, a phenolic resin, a polyimide-based resin, a polyvinyl acetate-based resin, a polystyrene-based resin, a polyvinyl alcohol-based resin, a melamine-based resin; a copolymer of these resins with other kind of materials; a modification thereof; and the like can be mentioned, but not limited thereto.

The thickness of the coating material to be used in lamination processing is also not particularly limited, and may be appropriately set depending on the intended purpose in the range of 10 and 100 μm. In general, for example, for a curtain airbag for side collision, the thickness of the coating material is preferably 10 to 40 μm in the specification corresponding to initial collision of an automobile and is preferably 40 to 100 μm in the specification corresponding to overturn of an automobile.

In addition, among the coating materials to be used in lamination processing, the thickness of the coating layer for ensuring airtightness may be appropriately selected depending on the application of a curtain airbag, and is preferably 2 to 32 μm in the specification corresponding to initial collision and is preferably 8 to 80 μm in the specification corresponding to overturn of an automobile. Further, the thickness of the adhesive layer bonding the coating layer and the base fabric may be appropriately selected depending on the adhesive strength or the like, and it is preferred to set the thickness of the adhesive layer to be 20 to 80% of the total thickness of the coating materials. When the thickness of the adhesive layer is less than 20%, the adhesive layer cannot sufficiently permeate the inside of base fabric, and the desired adhesive strength and the internal pressure maintainability of an airbag may not be achieved. In addition, when the thickness of the adhesive layer exceeds 80%, the thickness of the coating layer becomes insufficient, and the airtightness tends to be unachieved.

Further, in the material, in addition to the main materials, in order to improve the processability, the adhesiveness, the surface characteristics, or the durability, among various kinds of additive agents, which are usually used, for example, a crosslinking agent, an adhesion imparting agent, a reaction accelerator, a reaction retarder, a heat-resistant stabilizer, an antioxidant, a light stabilizer, an age resister, a lubricant, a smoothing agent, an anti-blocking agent, a pigment, a water repellent agent, an oil repellent agent, a masking agent such as titanium oxide, a gloss imparting agent, a flame retardant, a plasticizer, and the like, one or two or more kinds may be selected and mixed.

In addition, various kinds of pretreatment agents, adhesion improvers, and the like, which are for improving the adhesion with base fabric, may be added in the materials, or pretreatment such as primer treatment may be performed on a surface of base fabric in advance. Further, in order to improve the physical characteristics of the materials, or in order to impart the heat resistance, the aging resistance, the oxidation resistance, or the like, the materials are applied to base fabric, and then drying, crosslinking, vulcanizing, or the like may be performed by hot air treatment, pressure heat treatment, high energy treatment (high frequency, electron beams, UV rays, or the like), or the like.

EXAMPLES

Examples of the present invention will be described below.

(1) Internal Pressure Maintainability Test

A sensor for measuring internal pressure was attached to an airbag for testing, and air was introduced into the airbag for testing so that the internal pressure of the airbag is 50 kPa, and the valve was closed, then changes in the internal pressure of the airbag were recorded, and the internal pressure of the airbag 6 seconds after the valve closing was evaluated.

(2) Thickness Measurement

Measurement was performed in accordance with ISO 5084, and the results are shown by the values in a case of setting the thickness of Example 1 as 100.

(3) Weight Measurement

Measurement was performed in accordance with ISO 3801, and the results are shown by the values in a case of setting the weight of Example 1 as 100.

Example 1

Yarns having a fineness of polyester raw yarn of 466 dtex and a single yarn number of 96, manufactured by Hailide, were sized with a sizing agent containing a water-soluble polyester as the main component, and used as warps. As wefts, the same polyester raw yarns as those of the warps were used. By using an air jet loom (manufactured by DORMER) equipped with a jacquard machine (manufactured by Staubli), an inflation part was made of a double plain weave, the weave for an outer peripheral joining part was made of a 2/2 basket weave (FIG. 13-A) (13a), a reversible figured double weave (FIG. 13-B) (13b), and a 3/3 basket weave (FIG. 13-C) (13c) in this order from the inflation part side, a 8-harness twill weave (FIG. 9-C) (15) was provided with a width of 12 mm in an outer edge part connected to the outer peripheral joining part, and hollow weave base fabric was weaved so that the finished density is 57 warps/2.54 cm, and 49 wefts/2.54 cm.

The woven hollow weave base fabric was scoured by a continuous scouring machine, the scoured base fabric was dried, and then the dried base fabric was heat-set (set temperature 150° C.×30 seconds) with a pin tenter. Next, by a thermal lamination method, a multi-layered film (thickness: 40 μm, adhesive layer: polyolefin, and protective layer: polyether block amide) was laminated at a roll temperature of 150° C. and a linear pressure of 50 N/cm.

Next, the laminated material was cut into a predetermined shape with a laser cutting machine (manufactured by Lectra), the cut material was reinforced with stitching in the mounting part to an automobile body, and an airbag for testing was prepared. By using the prepared airbag, the weight, the thickness, and the internal pressure maintainability were evaluated. The results are shown in TABLE 1.

The hollow weave airbag provided with the twill-like structure area of the present invention in the outer edge part connected to the outer peripheral joining part was lightweight, thin, and excellent in the internal pressure maintainability.

Example 2

The weave for an outer peripheral joining part was made of a 2/2 basket weave (FIG. 13-A) (13a), a reversible figured double weave (FIG. 13-B) (13b), and a 3/3 basket weave (FIG. 13-C) (13c) in this order from the inflation part side, and hollow weave base fabric was prepared in accordance with the manner of Example 1 except that the weaving was performed by providing a pointed twill weave (FIG. 9-I) (15) with a width of 12 mm in an outer edge part spaced apart from the outer peripheral joining part.

The evaluation results are shown in TABLE 1.

The hollow weave airbag provided with the twill-like structure area of the present invention in the outer edge part spaced apart from the outer peripheral joining part was lightweight, thin, and extremely excellent in the internal pressure maintainability.

Example 3

The weave for an outer peripheral joining part was made of a 2/2 basket weave (FIG. 13-A) (13a), a reversible figured double weave (FIG. 13-B) (13b), and a 3/3 basket weave (FIG. 13-C) (13c) in this order from the inflation part side, and hollow weave base fabric was prepared in accordance with the manner of Example 1 except that the weaving was performed by providing an 8-harness twill weave (FIG. 9-C) or pointed twill weave (FIG. 9-I) (15) with a width of 12 mm in an outer edge part connected to the outer peripheral joining part such that the weave structure line extends along the outer peripheral shape of the inflation part.

The evaluation results are shown in TABLE 1.

The hollow weave airbag provided with the twill-like structure area of the present invention in the outer edge part connected to the outer peripheral joining part was lightweight, thin, and extremely excellent in the internal pressure maintainability.

Comparative Example 1

Hollow weave base fabric was prepared in accordance with the manner of Example 1 except that the weaving was performed such that the weave for an outer peripheral joining part is made of a 2/2 basket weave (FIG. 13-A) (13a), a reversible figured double weave (FIG. 13-B) (13b), and a 3/3 basket weave (FIG. 13-C) (13c) in this order from the inflation part side.

The evaluation results are shown in TABLE 1.

In a case where the twill-like structure area was not provided in the outer peripheral joining part, the internal pressure maintainability was significantly insufficient.

Comparative Example 2

Hollow weave base fabric was prepared in accordance with the manner of Example 1 except that the weaving was performed such that the weave for an outer peripheral joining part is made of a 2/2 basket weave (FIG. 13-A) (13a), a reversible figured double weave (FIG. 13-B) (13b), and a 3/3 basket weave (FIG. 13-C) (13c) in this order from the inflation part side.

The woven hollow weave base fabric was scoured by a continuous scouring machine, the scoured base fabric was dried, and then the dried base fabric was heat-set (set temperature 150° C.×30 seconds) with a pin tenter. Next, a silicone resin was applied onto a surface of the base fabric by knife coating with a base coat of 84 g/m² and a top coat of 10 g/m². Each heating condition was set to 180° C.×2 minutes, and 200° C.×1 minute.

The evaluation results are shown in TABLE 1.

In a case of being coated, the weight and the thickness were heavier and thicker, respectively as compared with those in a case of being laminated, and further the internal pressure maintainability was insufficient.

TABLE 1

| | Initial pressure [kpa] | 6 seconds later [kpa] | Retention [%] | Thickness | Weight |
|---|---|---|---|---|---|
| Example 1 | 54.4 | 44.7 | 82.2% | 100 | 100 |
| Example 2 | 53.5 | 47.1 | 88.0% | 100 | 100 |
| Example 3 | 51.7 | 46.2 | 89.4% | 100 | 100 |

TABLE 1-continued

| | Initial pressure [kpa] | 6 seconds later [kpa] | Retention [%] | Thickness | Weight |
|---|---|---|---|---|---|
| Comparative Example 1 | 50.6 | 27.8 | 54.9% | 100 | 100 |
| Comparative Example 2 | 51.2 | 36.6 | 71.5% | 110 | 124 |

REFERENCE SIGNS LIST

10 Hollow weave airbag
11 Inflation part
12 Outer region of inflation part
13 Outer peripheral joining part
13a to 13d Weave part
14 Outer edge part
15 Twill-like structure area
16 Weave part
17 Cut face
18 Adhesive layer
19 Coating layer
20 Coating material
21 Flow of gas
31 Part where adhesive layer continuously permeated
32 Part where adhesive layer discontinuously permeated
41 Collective connection line extending along the outer peripheral shape of inflation part
42 Collective connection line not extending along the outer peripheral shape of inflation part

The invention claimed is:

1. A hollow weave airbag (10) formed in an inflatable bag shape by weaving at least two pieces of base fabric, wherein the hollow weave airbag (10) includes an outer peripheral joining part (13) positioned on an outer periphery of an inflation part (11), and an outer edge part (14) extending on the outside of the outer peripheral joining part (13);

the outer peripheral joining part (13) is constituted of multiple weaves;

a twill-like structure area (15) made of a single weave is provided in at least part of an outermost layer position of the outer peripheral joining part (13), the outermost layer position is adjacent to the outer edge part (14) and is not adjacent to the inflation part;

the twill-like structure area (15) is constituted such that when a continuous connection line is formed by connecting the same peak weave points or the same valley weave points in any of up, down, left, and right directions in a minimum unit diagram of a weave diagram, the connection line extends in a diagonal direction of the weave diagram when viewed as a whole;

a weave different from a weave defined as to the twill-like structure area (15) is used in an innermost layer position of the outer peripheral joining part (13), the innermost layer position is adjacent to the inflation part (11); and an outer surface of the hollow weave airbag is laminated.

2. The hollow weave airbag according to claim 1, wherein in the twill-like structure area (15), a collective connection line formed by connecting the connection line of the minimum unit diagrams adjacent to each other extends along the outer peripheral shape of the inflation part (11) when viewed as a whole.

3. The hollow weave airbag according to claim 1, wherein the twill-like structure area (15) is continuous over an entire periphery in the outer peripheral joining part (13).

4. The hollow weave airbag according to claim 1, wherein the twill-like structure area (15) has a width of 10 to 100 warps or wefts.

* * * * *